United States Patent Office 3,038,934
Patented June 12, 1962

3,038,934
IODINATED 4-(4'-ALKOXYPHENOXY)PHENYL-PROPIONIC ACIDS
James F. Kerwin, Ardmore, Pa., assignor to Smith Kline & French Laboratories, Philadelphia, Pa., a corporation of Pennsylvania
No Drawing. Filed Mar. 17, 1959, Ser. No. 799,859
7 Claims. (Cl. 260—519)

This invention relates to a novel series of iodinated 4-(4'-alkoxyphenoxy)phenylpropionic acid derivatives. These new compounds unexpectedly have a high degree of antigoitrogenic activity coupled with a lower level of calorigenic activity, a specificity of action which is very favorable particularly when compared with standard thyromimetic agents such as triiodothyronine and its acetic acid analogue.

Furthermore, the compounds of this invention have been found to lower cholesterol levels of the blood with fewer side effects, such as B.M.R. effects, on the heart.

The new compounds of this invention are represented by the following basic structural formula:

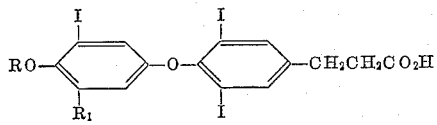

in which R represents a benzyl, diethylaminoethyl, dimethylaminoethyl or lower alkyl moiety having from 1 to 6 carbon atoms preferably methyl; and $R_1$ represents iodo or preferably hydrogen.

A preferred compound with an advantageous ratio of antigoitrogenic to calorigenic activity is 3,5-diiodo-4-(3'-iodo-4'-methoxyphenoxy)phenylpropionic acid.

While the compounds may be used as the free acids, their salt forms are also active and are a part of this invention. Any salt whose cation is nontoxic, pharmaceutically acceptable and stable may be employed such as the ammonium or other nitrogen containing salts but the alkali metal salts are preferred, especially the sodium and potassium salts. These salts are formed by reaction of the acids with the hydroxides such as ammonium hydroxide, sodium hydroxide or potassium hydroxide in a suitable aqueous medium.

The preferred methyl ethers are prepared by reacting the known iodinated 4-(4-hydroxyphenoxy)phenylpropionic acids with an excess of diazomethane in a suitable nonreactive organic solvent such as a chlorinated lower hydrocarbon, for example, methylene chloride or lower ether, for example, ethyl ether or combination of these solvents with a lower alkanol, for example, methanol. The ether-ester compound is obtained from this reaction. The ester moiety is split by gentle hydrolysis to give the desired propionic acid. The methyl esters are particularly important intermediates and are included in the scope of this invention.

The other compounds in which R is other than methyl are prepared from the methyl ester of the iodinated 4-(4'-hydroxyphenoxy)phenylpropionic acid derivative by reaction of the ester with a reactive chloride, bromide or iodide in the presence of one equivalent of sodium hydride in an aromatic solvent at 50–75° C. The reaction mixture is washed with water and the volatiles taken off to give the ether-ester which is hydrolyzed. Of course other protective ester moieties can be used equally well.

The following examples are designed to make all aspects of this invention readily apparent to one skilled in the art and are not meant to limit this invention.

Example 1

A solution of 2.8 g. of 3,5-diiodo-4-(3'-iodo-4'-hydroxyphenoxy)phenylpropionic acid in 75 ml. of methanol is added to a standard solution of about 0.03 mole of diazomethane in a mixture of methylene chloride and ether. The resulting solution is left in the refrigerator for 24 hours, then evaporated to leave a residue which is the methyl ester of 3,5-diiodo-4-(3'-iodo-4'-methoxyphenoxy)phenylpropionic acid, M.P. 131–133° C.

This solid is taken up in 50 ml. of 10% sodium hydroxide solution together with enough ethanol to bring into solution. The resulting solution is heated for 1.5 hours at 75° C., then for 1 hour on the steam bath. The aqueous solution is extracted with ether to remove any nonreacted ester. The aqueous layer contains the sodium salt which is isolated in crude form by evaporation. The aqueous solution of the salt is neutralized with dilute hydrochloric acid and cooled to separate the desired 3,5-diiodo-4-(3'-iodo-4'-methoxyphenoxy)phenylpropionic acid, M.P. 224–226° C.

Example 2

A solution of 6.4 g. of 3,5-diiodo-4-(3'-iodo-4'-hydroxyphenoxy)phenylpropionic acid in 165 ml. of methanol is reacted with a standard solution of 1 mole equivalent of diazomethane solution in the cold. Evaporation gives the residual methyl 3,5-diiodo-4-(3'-iodo-4'-hydroxyphenoxy)phenylpropionate.

A mixture of 0.65 g. of the ester, 0.15 g. of benzyl chloride and 1 equivalent of sodium hydride in 150 ml. of dry toluene is heated for 1 hour at 50° C. A few drops of ethanol are added. The solution is washed with water, dried and evaporated to leave the residual ether-ester.

This solid is hydrolyzed with sodium hydroxide solution at 75° C. for 2 hours. The sodium salt and free acid forms of 3,5-diiodo-4-(3'-iodo-4'-benzyloxyphenoxy)phenylpropionic acid are isolated as in Example 1.

Example 3

A solution of 3.8 g. of 3,5-diiodo-4-(3',5'-diiodo-4'-hydroxyphenoxy)phenylpropionic acid in 150 ml. of methanol is esterified and etherified with a 10 fold excess of standard diazomethane solution to give the ester-ether. This compound is hydrolyzed by heating with 10% sodium hydroxide solution and methanol for 60° C. for one hour as in Example 1 to give the sodium salt and free acid forms of 3,5-diiodo-4-(3,5'-diiodo-4'-methoxyphenoxy)phenylpropionic acid.

Example 4

A mixture of 0.65 g. of methyl ester of the triiodo compound of Example 2, 1.8 g. of diethylaminoethyl bromide and 1 equivalent of sodium hydride in 125 ml. of benzene is heated at about 50° C. for several hours. The solution is washed with water, dried and evaporated to give the ether-ester which is hydrolyzed by the method of Example 1 with potassium hydroxide solution to give the potassium salt and free acid forms of 3,5-diiodo-4-(3'-iodo-4' - diethylaminoethoxyphenoxy)phenylpropionic acid.

Example 5

A mixture of 0.33 g. of the methyl ester intermediate of Example 2, 0.11 g. of hexyl iodide and 1 equivalent of sodium hydride in 75 ml. of toluene is heated at 55° C. for 1 hour. The solution is washed, dried and evaporated to give the ester-ether intermediate. This compound is hydrolyzed with 10% sodium hydroxide solution as in Example 1 to give 3,5-diiodo-4-(3'-iodo-4'-hexyloxyphenoxy)phenylpropionic acid.

This acid (50 mg.) is suspended in a few ml. of water and neutralized with ammonium hydroxide solution. Evaporation of the solution gives the ammonium salt.

Example 6

A solution of 0.64 g. of 3,5-diiodo-4-(3',5'-diiodo-4'-hydroxyphenoxy)phenylpropionic acid in 75 ml. of methanol is reacted with a standard solution containing 1 mole equivalent of diazomethane in the cold for 2 days. Evaporation gives the methyl ester. The crude ester (0.39 g.) is reacted with 80 mg. of dimethylaminoethyl bromide and 1 equivalent of sodium hydride as in Example 4. The reaction product is hydrolyed by heating with 10% sodium hydroxide solution to give 3,5-diiodo-4-(3',5'-diiodo-4' - dimethylaminoethoxyphenoxy)phenylpropionic acid.

Example 7

A solution of 0.64 g. (0.001 mole) of the tetraiodo methyl ester of Example 6 is reacted with 100 mg. of isobutyl iodide as in Example 6 to give the desired 3,5-diiodo-4-(3',5'-diiodo - 4' - isobutoxyphenoxy)phenylpropionic acid. In similar fashion 0.33 g. of the triiodo ester of Example 2 is reacted with 80 mg. of ethyl iodide to give the ether-ester intermediate which is in turn hydrolyzed with sodium hydroxide to give 3,5-diiodo-4-(3'-iodo-4'-ethoxyphenoxy)phenylpropionic acid.

What is claimed is:
1. A chemical compound of the formula:

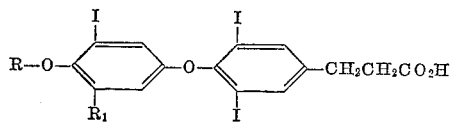

in which R is a member selected from the group consisting of benzyl, dimethylaminoethyl, diethylaminoethyl and alkyl having from 1 to 6 carbon atoms inclusive; and $R_1$ is a member selected from the group consisting of iodo and hydrogen.

2. A chemical compound of the formula:

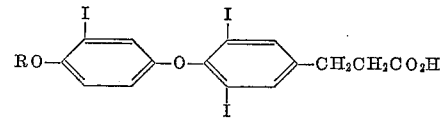

in which R is alkyl having from 1 to 6 carbon atoms inclusive.

3. 3,5-diiodo-4-(3'-iodo - 4' - methoxyphenoxy)phenylpropionic acid.
4. 3,5-diiodo- 4 -(3'-iodo-4'-benzyloxyphenoxy)phenylpropionic acid.
5. 3,5-diiodo - 4 - (3',5'-diiodo - 4' - methoxyphenoxy)-phenylpropionic acid.
6. 3,5-diiodo-4-(3' - iodo - 4' - diethylaminoethoxyphenoxy)phenylpropionic acid.
7. 3,5-diiodo-4-(3' - iodo-4'-ethoxyphenoxy)phenylpropionic acid.

References Cited in the file of this patent

Bruice et al.: J. Biol. Chem., 210, 6 (1954).
Bruice et al.: Arch. of Biochem. and Biophy., 62, 306–7 (1956).
Kharasch et al.: J. Org. Chem., 21, 929–30 (1956).
Meltzer et al.: J. Org. Chem., 22, 1579 (1957).